United States Patent [19]

Park et al.

[11] Patent Number: 5,753,817

[45] Date of Patent: May 19, 1998

[54] MICROGYROSCOPE WITH VIBRATORY STRUCTURE HAVING A MULTITUDE OF GROOVES

[75] Inventors: Kyu-yeon Park; Chong-won Lee; Young-ho Cho, all of Taejon; Ci-moo Song, Sungnam, all of Rep. of Korea

[73] Assignees: Samsung Electronics Co., Ltd.; Korea Advanced Institute of Science and Technology, both of Suwon, Rep. of Korea

[21] Appl. No.: 773,989

[22] Filed: Dec. 26, 1996

[30] Foreign Application Priority Data

Dec. 27, 1995 [KR] Rep. of Korea ............... 95-59492

[51] Int. Cl.⁶ .......................................................... G01P 9/00
[52] U.S. Cl. ................................... 73/504.12; 73/504.02
[58] Field of Search .......................... 73/504.02, 504.04, 73/504.12, 504.16, 504.18, 514.29; 74/5.6 D; 361/280, 281

[56] References Cited

U.S. PATENT DOCUMENTS

5,226,321  7/1993  Varnham ..................... 73/504.13
5,392,650  2/1995  O'Brien ....................... 73/514.29

*Primary Examiner*—Christine K. Oda
*Attorney, Agent, or Firm*—Burns, Doane, Swecker & Mathis, L.L.P.

[57] ABSTRACT

A microgyroscope includes a substrate, a first sensor where a plurality of stripe-shaped anodes and cathodes are alternatively arrayed in parallel on the substrate, a driver arranged to be perpendicular to a stripe length direction of the first sensor on the substrate and where a plurality of stripe-shaped anodes and cathodes are alternatively arrayed in parallel, a vibratory structure having a plurality of first grooves of a stripe shape vertically spaced from a plane of the first sensor and the driver at a predetermined height and formed in a direction congruous with a stripe length direction of first sensor and a plurality of second grooves of a stripe shape formed in a direction congruous with a stripe length direction of the driver, a support portion formed on the substrate for maintaining the vibratory structure from the substrate at a predetermined height, and elastic members for elastically connecting the vibratory structure and the support portion.

8 Claims, 7 Drawing Sheets

MICROGYROSCOPE WITH VIBRATORY STRUCTURE HAVING A MULTITUDE OF GROOVES

BACKGROUND OF THE INVENTION

The present invention relates to a microgyroscope, and more particularly, to a microgyroscope in which a driving electrode for applying pressure to a vibratory structure is disposed vertically thereunder with respect to a plane of the vibratory structure and in which displacement of the vibratory structure occurs in the plane of direction of the vibratory structure by a Coriolis force.

An angular velocity sensor (gyroscope) for detecting angular velocity of an inertial object has been employed as a core part of a navigation apparatus for guided missiles, vessels or airplanes. The fields of application for the sensor have been extended to a navigation apparatus for automobiles and apparatus for detecting and correcting hand quiver in a high-magnification video camera. A conventional gyroscope can provide precise angular velocity measurements. However, due to its large structure and high manufacturing costs associated with the required precision processing and the multitude of complex parts, it is not suitable for general industrial purposes or home electronics.

Recently, a small gyroscope having piezo-electric elements attached to a triangular prismatic beam has been developed for use as a hand-quiver sensor in video cameras. To overcome difficulties in manufacturing the gyroscope having the piezo-electric elements, another small gyroscope having a cylindrical beam structure has been developed.

However, since both small gyroscopes of the above two types require precision processing, manufacturing of the same is difficult and expensive. It is difficult to develop a circuit-integrated type in gyroscope since gyroscopes are made of a multitude of mechanical parts.

To improve upon the above-mentioned gyroscopes, a more economic and accurate gyroscope is under development using micro machining technology. The principle behind this gyroscope is that when an inertial object which vibrates or rotates uniformly in a first axial direction receives an input of angular velocity by rotation in a second axial direction perpendicular to the first axial direction, a Coriolis force generated in a third axial direction perpendicular to both first and second axes is measured to thereby detect the rotational angular velocity. Here, the equalization of forces applied to an inertial object raises the accuracy of the angular velocity detection. In particular, a structure using the equalization of forces is preferable to broaden the linearity and bandwidth of a signal.

Figure 1:
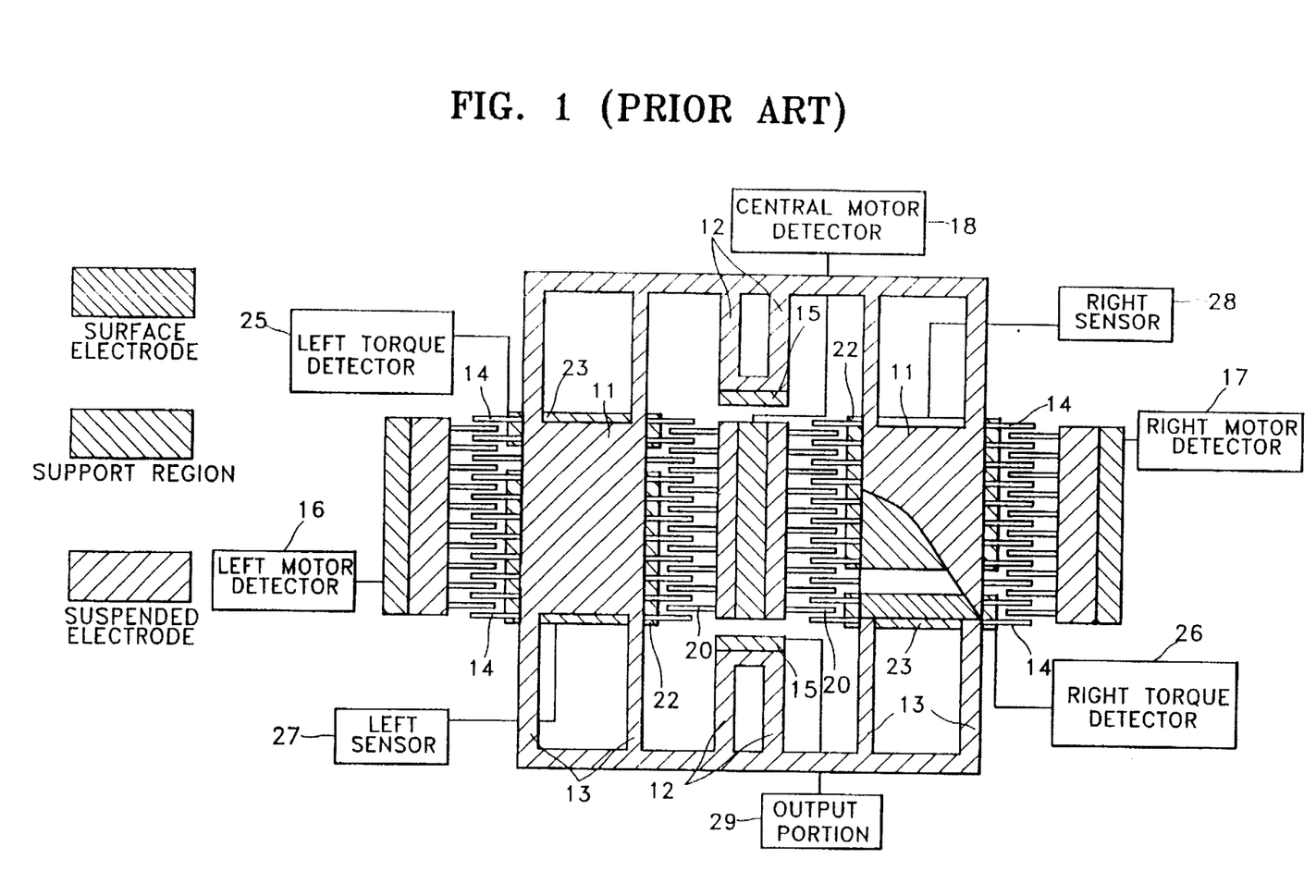
FIG. 1 is a plan view illustrating a conventional microgyroscope.

In FIG. 1, the structure of a comb motor type gyroscope using a tuning fork mode developed by the Charles Stark Draper Laboratory, Inc. and disclosed in U.S. patent Ser. No. 5,349,855 is illustrated. The gyroscope shown in FIG. 1 constructed by the micro machining technology comprises a flat vibratory structure 11, springs 12 and 13 connected to vibratory structure 11, and a comb 14 for applying an electrostatic force to the vibratory structure 11. The vibratory structure 11 is spaced from a substrate by a predetermined gap and is supported by the portion indicated by reference numeral 15. The gyroscope can be divided into: a surface electrode attached to the substrate, a suspended electrode spaced from the substrate by a predetermined gap, and a support region for supporting the suspended electrode.

The microgyroscope shown in FIG. 1 operates by applying an electrostatic force to the comb 14 formed at both sides of the vibratory structure 11 by using left and right motors 16 and 17 to thereby generate vibration of a tuning fork mode in one direction. The one-directional movement of the vibratory structure 11 is detected from the change of capacitance of the comb 20 disposed at the center thereof, and the detected signal is fed back to the motors 16 and 17. When a voltage capable of inducing a vibration satisfying the unstable oscillation control limit cycle is applied to the left and right motors 16 and 17, the structure continuously vibrates at its natural frequency. When the inertial object rotates in a perpendicular direction in a plane with respect to the vibrational direction of the vibration from the electrostatic force of the motors 16 and 17, a Coriolis force is generated in a direction perpendicular to both directions, i.e., the vertical direction with respect to the plane. The Coriolis force displaces the vibratory structure 11 in a direction perpendicular to the plane of FIG. 1. The displacement provides a torsional force to vibratory structure 11. The Coriolis force is detected by the detection of torque in the vibratory structure 11 detected from the change in capacitance caused by electrodes 22 disposed at two portions under vibratory structure 11. Vibratory structure 11 is displaced in the Z direction, i.e., is subject to the torsion as described above, and an electrostatic force is generated by a torque electrode 23 as a force equilibration method capable of offsetting the torsion. Torque electrode 23 for making the torsional forces equal is disposed at two portions situated diagonally from each other under the vibratory structure 11. In FIG. 1, reference numeral 18 denotes a center motor detector; reference numerals 25 and 26 denote left and right torque detectors, respectively; reference numerals 27 and 28 denote left and right sensors, respectively; and reference numeral 29 denotes an output portion.

Figure 2A:
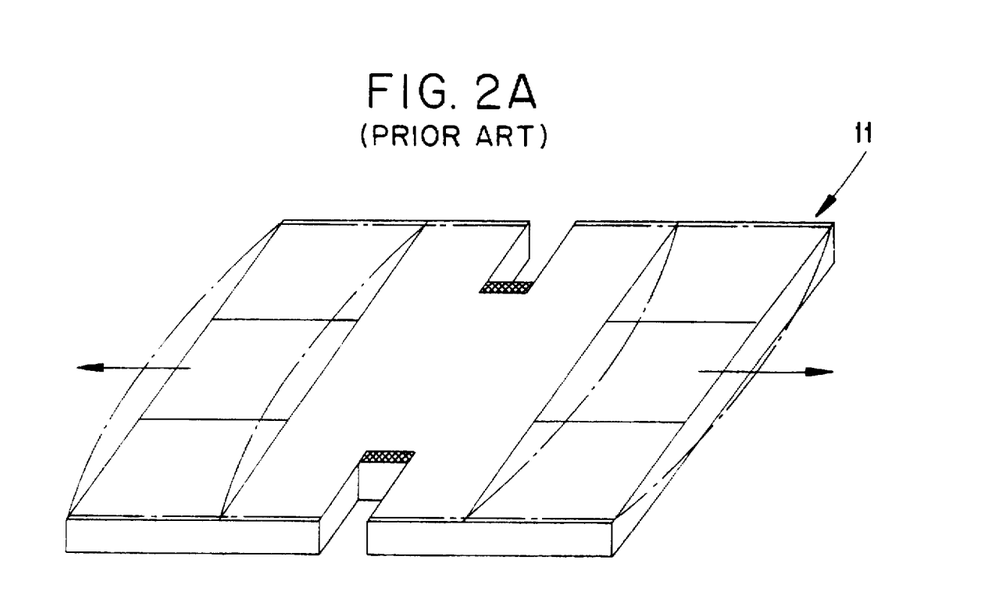
FIGS. 2A and 2B are perspective views illustrating vibration states of the vibratory structure of the microgyroscope of FIG. 1.
Figure 2B:
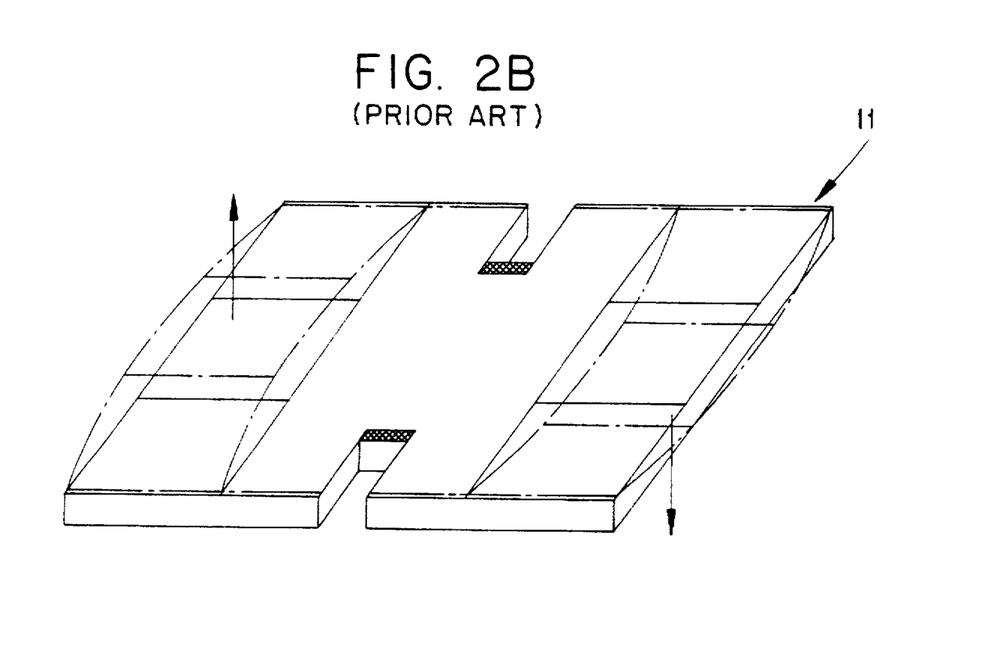

The gyroscope according to the conventional technology as illustrated in FIG. 1 has the following problems. First, it is very difficult to match the natural frequency with respect to each direction of vibration in vibratory structure 11. That is, a planar vibratory structure generally vibrates in a direction parallel to the plane as shown in FIG. 2A or in a direction perpendicular to the plane as shown in FIG. 2B, and the natural frequency in both directions must be matched. To adjust, the thickness and width of springs 12 and 13 for supporting vibratory structure 11 is manufactured within a range of predetermined machining errors, which are several to tens of angstroms. Also, since springs 12 and 13 are manufactured separately with differences in thickness and widths, the task of matching of each natural frequency with respect to both directions is arduous. If the natural frequencies are not matched at each manufacturing process, the natural frequency may be matched through an additional process during operation. However, that process makes it difficult to perform standardization of products and deviation management.

Also, in order to measure the displacement of vibratory structure 11 according to the Coriolis force in the micro gyroscope of FIG. 1, a predetermined gap must be maintained between the electrodes 22 and 23 attached to the substrate and vibratory structure 11. However, the determination of the gap consequently incurs fatal limitations on resolution, used frequency and linearity of the gyroscope. Since the sensitivity of the gyroscope is inversely proportional to the square of the gap, the gap must be narrow in order to increase the sensitivity. However, since a uniform DC current is applied to the electrode 22 to drive a sensor for sensing the displacement of the vibratory structure 11, the vibratory structure 11 contacts the substrate when the gap is considerably narrow. Further, since the change in capacitance between the surface electrodes of the substrate and the vibratory structure 11 is inversely proportional to the square of the gap, the linearity the angular velocity of an output value is poor. The gyroscope must be designed to be capable of greatly generating a displacement in the sensing direction with respect to a constant angular velocity to enhance the sensitivity thereof. However, a phenomenon of the vibratory structure 11 contacting the electrodes 22 occurs when the deformation thereof becomes great.

The torque electrode 23 is installed at two diagonal positions under the vibratory structure 11 to prevent the contact phenomenon. However, since such a regular position control method exhibits a tendency to narrow the gap between the substrate and vibratory structure 11 in the place where the torque electrode 23 is not installed when a voltage is applied to the torque electrode 23, the regular position control cannot be performed accordingly. When the elasticity of the springs 12 and 13 is enhanced to compensate for the above defects, the natural frequency of the gyroscope consequently increases thereby negatively affecting the sensitivity increase in the gyroscope.

SUMMARY OF THE INVENTION

To solve the above problems, it is an object of the present invention to provide a microgyroscope having a vibratory structure having a multitude of grooves.

It is another object of the present invention to provide a microgyroscope having a driving electrode and a sensing electrode in which anode and cathode strips are disposed.

It is still another object of the present invention to provide a microgyroscope having a driving electrode and a sensing electrode that are vertically arranged under the plane of the vibratory structure.

It is yet another object of the present invention to provide a microgyroscope for applying a horizontally and vertically synthesized driving force to a vibratory structure.

It is still yet another object of the present invention to provide a microgyroscope for generating a displacement of a vibratory structure due to a Coriolis force in one direction of the plane of the vibratory structure.

Accordingly, to achieve the above objects, there is provided a microgyroscope comprising: a substrate: first sensing means where a plurality of stripe-shaped anodes and cathodes are alternatively arrayed in parallel on said substrate; driving means arranged to be perpendicular to a stripe length direction of said first sensing means on said substrate and where a plurality of stripe-shaped anodes and cathodes are alternatively arrayed in parallel; a vibratory structure having a plurality of first grooves of a stripe shape vertically spaced from a plane of said first sensing means and said driving means at a predetermined height and formed in a direction congruous with a stripe length direction of first sensing means and a plurality of second grooves of a stripe shape formed in a direction congruous with a stripe length direction of said driving means; a support portion formed on said substrate for maintaining said vibratory structure from said substrate at a predetermined height; and elastic members for elastically connecting said vibratory structure and said support portion.

It is preferred in the present invention to further comprise second sensing means arranged at both sides of said driving means in the same shape as those of the stripe electrodes of said driving means and for detecting an initial vibration state of said vibratory structure to vibrate in the natural frequency.

It is also preferred in the present invention that said first sensing means is disposed at two positions parallel on said substrate and said driving means is arranged between said first sensing means.

It is also preferred in the present invention that said first sensing means is disposed at two parallel positions on said substrate and said driving means is arranged between said first sensing means.

It is also preferred in the present invention that the stripe shape of said first sensing means is formed to be narrower and longer than that of said second sensing means and the stripe shape of said first groove of said vibratory structure is formed to be narrower and longer than that of said second groove.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 3A:
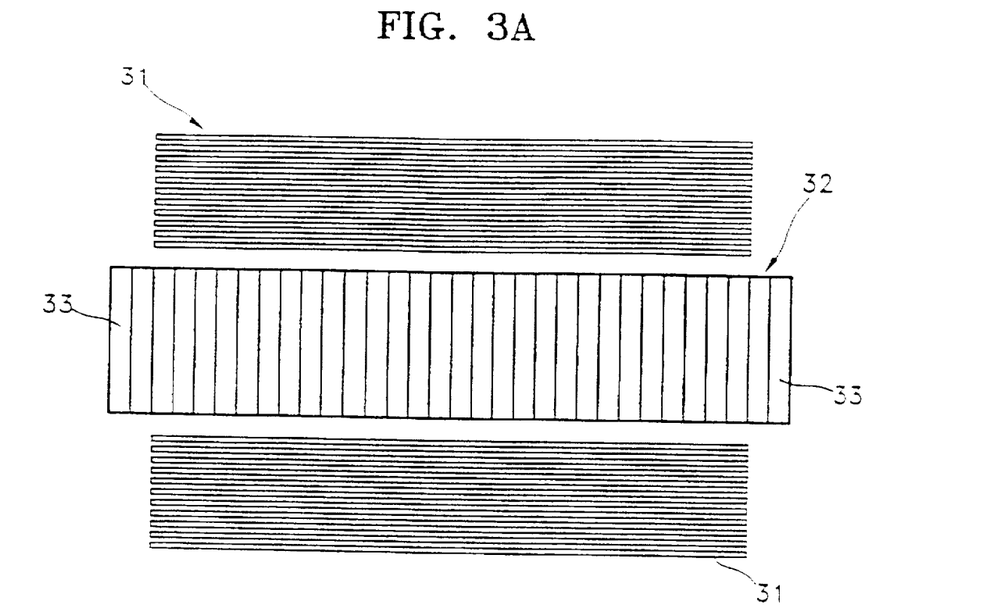
FIG. 3A is a plan view illustrating an electrode structure of a microgyroscope according to the present invention.
Figure 3B:
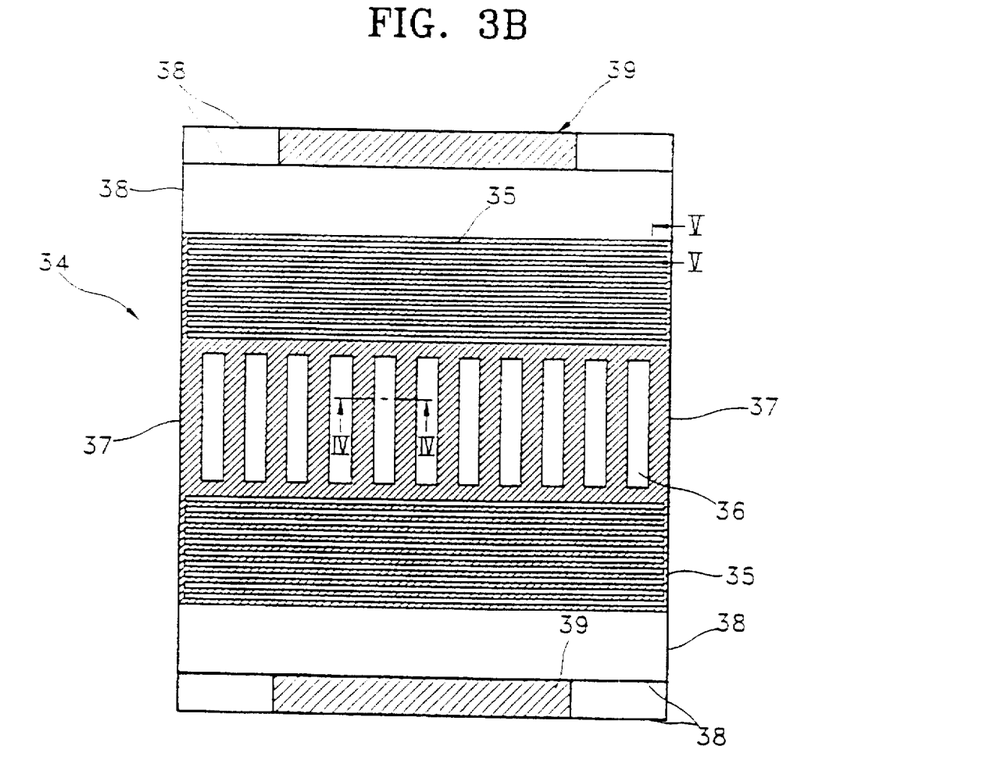
FIG. 3B is a plan view illustrating the vibratory structure of a microgyroscope according to the present invention.

FIG. 3A is a plan view of a driving electrode and a sensing electrode formed on a wafer substrate of a microgyroscope according to the present invention; and FIG. 3B is a plan view of a vibratory structure.

Referring to FIG. 3A a first sensing electrode 31 has anode and cathode strips alternately juxtaposed on a substrate. First sensing electrodes 31 are disposed in both sides of a driving electrode 32. The driving electrode 32 is formed by alternately arraying parallel anode and cathode strips perpendicular to the first sensing electrode 31. The strips of the driving electrode 32 are wider and shorter than those of the first sensing electrode 31. The first sensing electrode 31 is for sensing displacement of the vibratory structure due to a Coriolis force and the driving electrode 32 is for applying pressure to the vibratory structure.

A second sensing electrode 33 is disposed at each end of the driving electrode 32 and has the same shape as that of the driving electrode 32. The second sensing electrode 33 is for sensing the vibration of the vibratory structure and applying a voltage satisfying an unstable oscillation control limit cycle to the driving electrode 32 so that a vibratory structure 34 can continuously vibrate at its natural frequency. The directions of the stripes of the driving electrode 32 and the second sensing electrode 33 are perpendicular to those of the first sensing electrode 31.

In FIG. 3B, a vibratory structure 34 is disposed at a predetermined position spaced from the electrodes 31, 32 and 33 on the substrate shown in FIG. 3A. The vibratory structure 34 is made of a plate formed over the sensing electrodes 31 and 33 and the driving electrode 32, on which first and second grooves 35 and 36 are formed. The directions of the first and second grooves 35 and 36 are the same as those of the individual electrode strips disposed under the vibratory structure 34. That is, the directions of the first grooves 35 are the same as those of the strips of the first sensing electrode 31, and those of the second grooves 36 are the same as those of the strips of the electrodes 32 and 33.

Springs 38 are connected to vibratory structure 34, and also connected to supports 39 formed at a predetermined height from the substrate. Springs 38 connected with four vertices of rectangular vibratory structure 34 are connected with supports 39 arrayed at both sides of vibratory structure 34 so as to vibrate until vibratory structure 34 receives a driving force.

Figure 4:
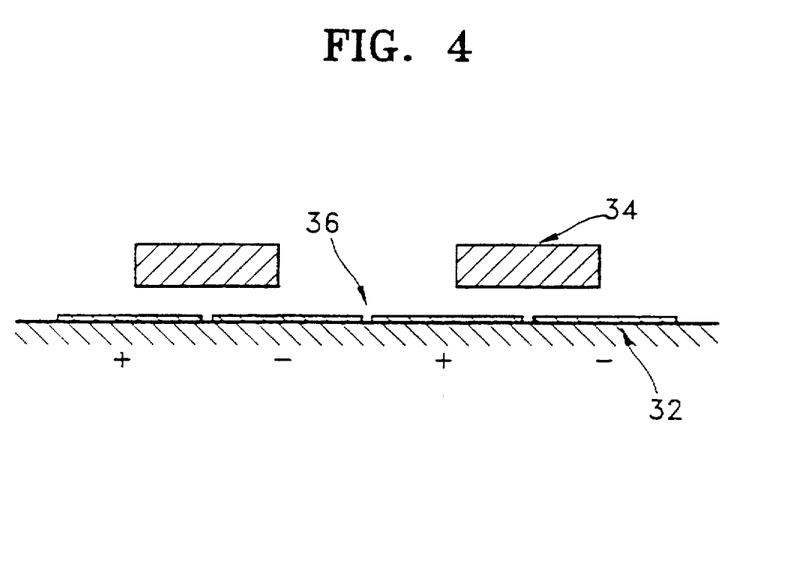
FIG. 4 is a vertical section taken along line IV—IV of FIG. 3B in the assembled state of the microgyroscope of the present invention.

FIG. 4 is a section taken along line IV—IV of FIG. 3B in which the electrodes of the substrate shown in FIG. 3A are assembled to the vibratory structure shown in FIG. 3B. The driving electrode 32 has anode and cathode strips alternately arranged on the substrate. Vibratory structure 34 along with second groove 36 formed therein is arranged at a position above the substrate at a predetermined height.

Figure 5:
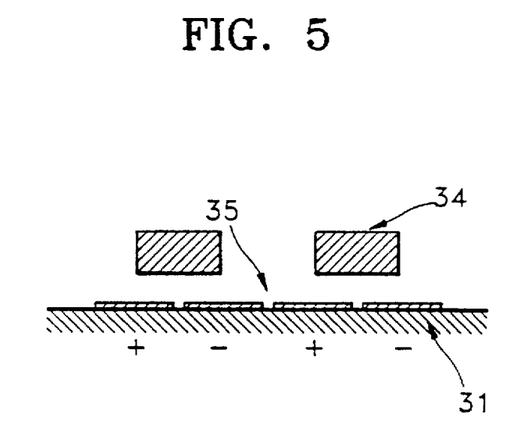
FIG. 5 is a vertical section taken along line V—V of FIG. 3B in the assembled state of the microgyroscope of the present invention.

FIG. 5 is a section taken along line V—V of FIG. 3B in which the electrodes are assembled to the vibratory structure. The first sensing electrode 31 whose anode and cathode strips are alternatively arrayed are arranged on the substrate. Vibratory structure 34 along with first grooves 35 is positioned above the substrate at a predetermined height.

The operation and structure of the gyroscope according to the present invention will now be described.

Figure 7:
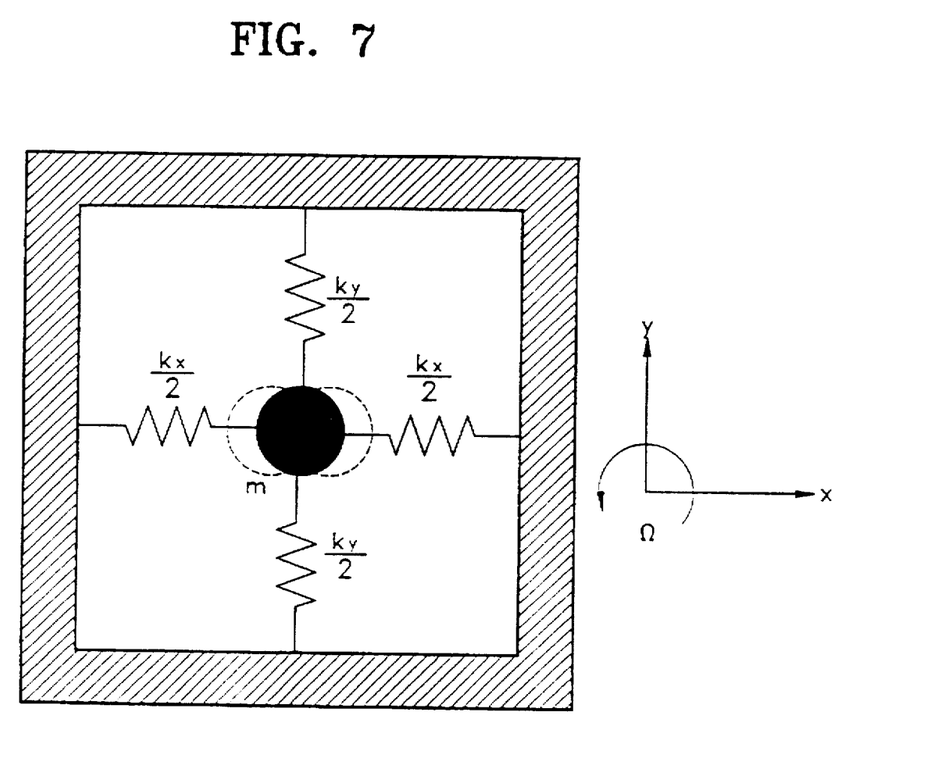
FIG. 7 is a view illustrating a configuration of a general vibration mechanism.

FIG. 7 illustrates a model of a vibration mechanism such as a gyroscope by modeling the same. A vibratory structure having mass m is supported by springs in the X and Y directions. In such a vibration mechanism, an external force f applied to the vibratory structure so that it vibrates in the X-axis direction can be expressed as follows.

$$f = F \sin(\omega t)$$

Here, F denotes the whole external force applied to the vibratory structure, and $\omega t$ represents an angle of rotation for a time t at an angular velocity $\omega$.

In this case, the displacement (X) and the velocity (V) of the vibratory structure moving in the X direction can be expressed as follows.

$$x = -\frac{FQ_x}{k_x} \cos(\omega t) \text{ and}$$

$$V_x = \frac{FQ_x \omega}{k_x} \sin(\omega t)$$

Here, x is the displacement along X-axis, and $V_x$ is velocity of the vibratory structure along the X-axis. Also, $k_x$ is a spring constant in the X-axis direction. The displacement y occurring along the Y-axis due to a Coriolis force generated in proportion to an input angular velocity is calculated as follows.

$$y = \frac{2FQ_xQ_y}{\omega k} \Omega \sin(\omega t)$$

Here, $Q_x$ and $Q_y$ are constants Q with respect to the X- and Y-axes, respectively, and $\Omega$ is the input angular velocity. K denotes a spring constant. Thus, the rotation angular velocity of an inertial object can be measured by detecting the displacement of y.

Referring to FIGS. 3 through 6, in the microgyroscope of the present invention, mass m corresponds to the mass of vibratory structure 34, and when AC voltage corresponding to the natural frequency of vibratory structure 34 is applied to driving electrode 32, vibratory structure 34 vibrates in the plane direction perpendicular to the strips of driving electrode 32. Since the lengthwise directions of second grooves 36 formed on vibratory structure 34 are arranged parallel to those of the strips of driving electrode 32, the vibrating direction of vibratory structure 34 driven by driving electrode 32 is to be perpendicular to the lengthwise directions of second grooves 36.

As described above, since the anodes and cathodes of driving electrode 32 are alternately arrayed in parallel, the direction of the electrostatic force generated between the anodes and vibratory structure 34, when the AC voltage is positive, and the direction of an electrostatic force generated between the cathodes and vibratory structure 34, when AC voltage is negative, are opposing each other. Thus, vibratory structure 34 can vibrate according to the application of AC voltage.

In the meantime, since driving electrode 32 is perpendicularly arrayed with respect to vibratory structure 34, the electrostatic force is applied in the vertical direction according to the voltage applied to the driving electrode 32. Accordingly, the composite force of the driving forces operating on vibratory structure 34 acts in a slanted direction.

The driving force f generated by applying AC voltage to driving electrode 32 can be expressed as follows.

$$f = \frac{\epsilon L_x V^2 n_x}{2h}$$

Here, f is the driving force; $\epsilon$ is the dielectric constant of air; $L_x$ is the length of driving electrode 32; $n_x$ is the number of pairs of driving electrode 32; the V is driving voltage; and h is the distance between vibratory structure 34 and driving electrode 32.

The initial vibration caused by the driving force of driving electrode 32 is detected from the change in the capacitance between the outer most portion 37 of vibratory structure 34 and second sensing electrode 33. From the detected signal, a voltage satisfying the unstable oscillation control limit cycle is applied to driving electrode 32 to thereby generate a continuous vibration in vibratory structure 34 at its natural frequency.

Figure 6A:
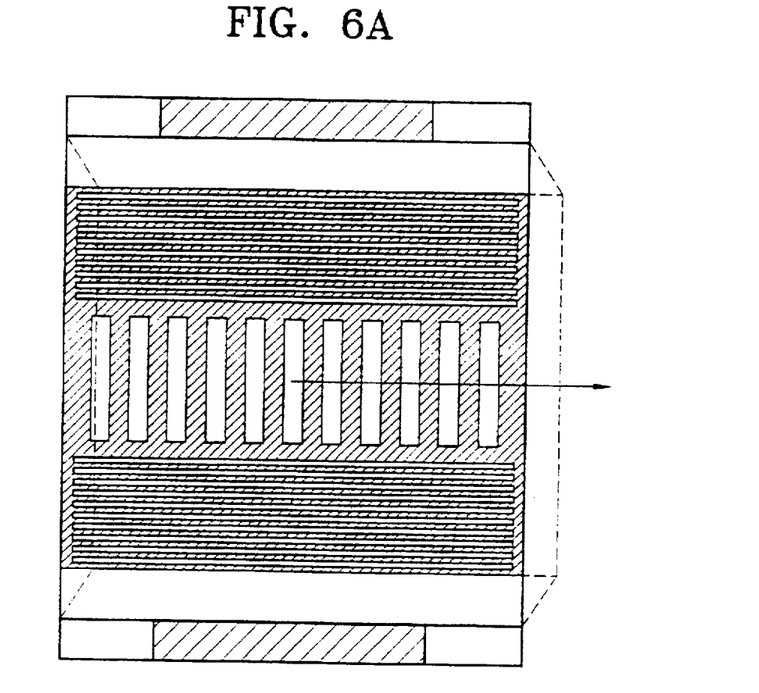
FIGS. 6A and 6B are views illustrating vibration states of the vibratory structure of the microgyroscope of the present invention.
Figure 6B:
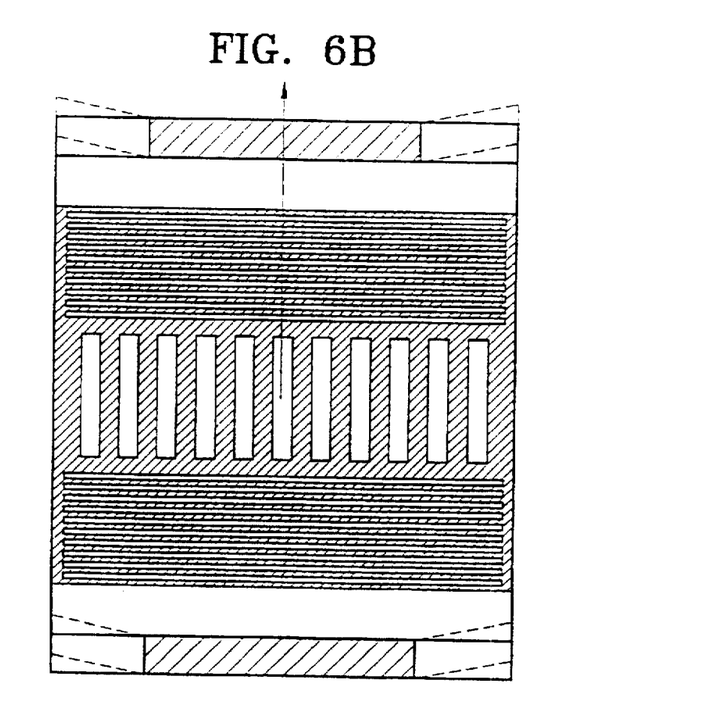

When vibratory structure 34 receives the force of an angular velocity in a vertical direction with respect to a substrate plane in a state where vibratory structure 34 receives such a driving force, vibratory structure 34 is displaced due to a Coriolis force. The direction of displacement from to the Coriolis force is perpendicular to the pressure-applying direction of driving electrode 32 in the plane of the vibratory structure 34. FIG. 6A shows the driving mode of driving electrode 32, and FIG. 6B shows the displacement of vibratory structure 34 due to the Coriolis force.

The Coriolis force induced displacement of vibratory structure 34 generates change the capacitance between first sensing electrode 31 and vibratory structure 34. As described above, first sensing electrode 31 is comprised of strips of anodes and cathodes alternately arrayed in parallel. Since a multitude of first grooves 35 of a striped shape are formed at a portion of vibratory structure 34 arranged vertically over first sensing electrode 31, the capacitance between vibratory structure 34 and first sensing electrode 31 changes when vibratory structure 34 moves in a direction perpendicular to the lengthwise direction of first sensing electrodes 31 or first grooves 35 of vibratory structure 34 due to the Coriolis force. Accordingly, the displacement of vibratory structure 34 according to the Coriolis force can be measured in first sensing electrode 31. As described above, since the anodes and cathodes of first sensing electrode 31 are alternately arrayed in parallel, changes in the capacitance with respect to the anodes and cathodes reverses. The displacement by the Coriolis force is measured by calculating the difference in the capacitance induced in the anodes and cathodes. The difference $\Delta C$ of the capacitance between both electrodes can be expressed as follows.

$$\Delta C = \frac{2n_y \epsilon L_y y}{h}$$

Here, $n_y$ is the number of pairs of anodes and cathodes in sensing electrode 38; $\epsilon$ is the dielectric constant of air; $L_y$ is the length of the first sensing electrodes 31; h is the gap between first sensing electrodes 31 and vibratory structure 34. By using a general circuit for detecting the change of capacitance, an angular velocity signal can be detected.

Meanwhile, in the present invention described above, since vibratory structure 34 is driven by the electrostatic force generated from driving electrodes 32 arranged on the substrate, the driving force can be divided into a horizontal component parallel to the a plane of vibratory structure 34 and a vertical component perpendicular to the plane. Thus, a phenomenon of vibratory structure 34 sticking to the substrate due to the electrostatic force of the vertical component can be prevented. When a driving voltage is applied to driving electrode 32 and a bias voltage is applied to first sensing electrode 31, the electrostatic force $f_b$ in the vertical direction can be expressed as follows.

$$f_b = \frac{\epsilon A_a V_p^2}{2h^2} + \frac{\epsilon A_s V_b^2}{2h^2}$$

Here, $\epsilon$ is the dielectric constant of air; $A_a$ is the area of vibratory structure 34 to which the electrostatic force of the driving voltage is applied; $V_p$ is the maximum value of the driving voltage; $A_s$ is the area of vibratory structure 34 to which the electrostatic force is applied by first sensing electrode 31; $V_b$ is the bias voltage applied to first sensing electrode 31; and h is the gap between vibratory structure 34 and first sensing electrode 31.

When a particular deformation due to the electrostatic force occurs in vibratory structure 34, an elastic restoring force is generated by spring 38. The force $f_k$ of spring 38 can be expressed as follows.

$$f_k = k_g(h_0 - h)$$

Here, $k_g$ is the spring constant with respect to the lengthwise direction of a stripe of driving electrode 32; $h_0$ is a gap between vibratory structure 34 and driving electrode 32 before receiving the electrostatic force; and h is a gap between vibratory structure 34 and driving electrode 32 after deformation due to the electrostatic force.

Figure 8:
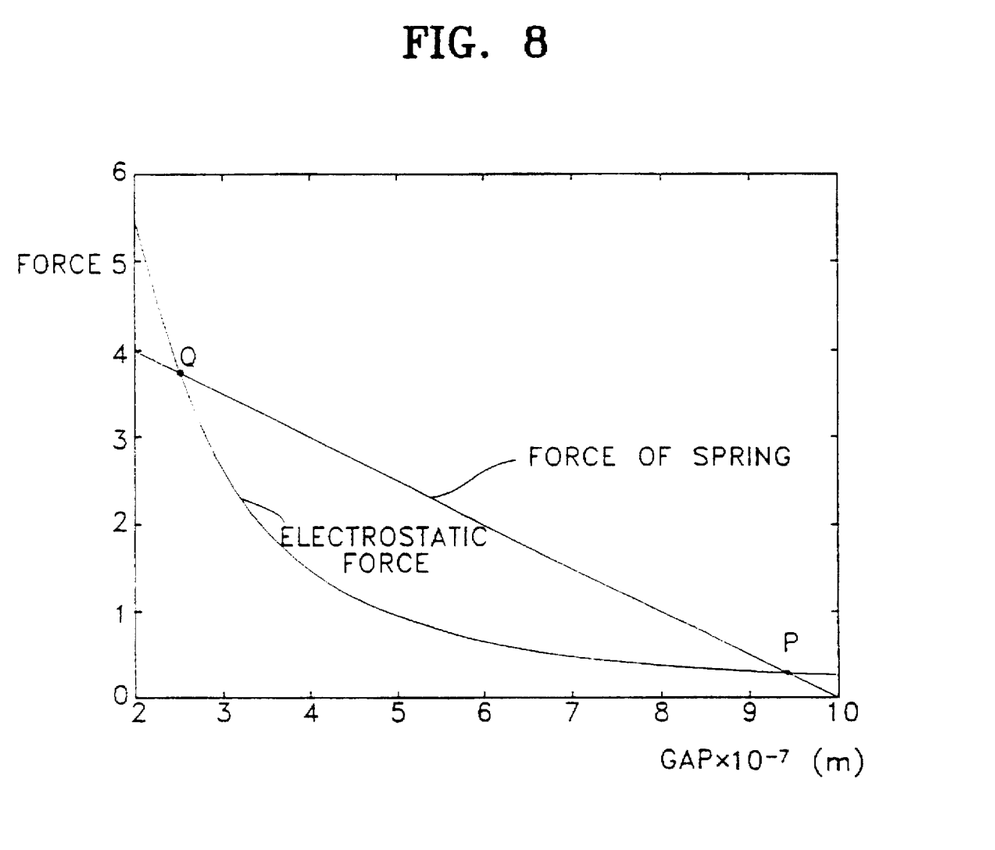
FIG. 8 is a graph indicating the relationship between a spring force and an electrostatic force with respect to a gap between the vibratory structure and a driving electrode.

Vibratory structure 34 vibrates between the positions at which the elastic force of spring 38 and the electrostatic force are at equilibrium. The relationship between the gap and the force is shown in a graph in FIG. 8. The spring force indicated by the straight line and the electrostatic force indicated by the curve cross at points P and Q in the graph. However, the point P is an equilibrium point where the forces become stable, and thus, it can be seen that the forces of moving portions make equilibrium at the point P when the maximum voltage is applied to driving electrode 32. Since the gap between vibratory structure 34 and the electrodes is wide enough, it can be seen that vibratory structure 34 vibrates spaced from the surface of the electrodes at a constant interval.

As described above, the microgyroscope according to the present invention has a simplified structure so that the manufacturing of the same is easy and has superior performance while reducing the possibility of faulty operation. Also, since the adjusting process of the natural frequency with respect to two axes which determines the performance of the microgyroscope using two-axes vibratory structure can be performed in a single process due to the structure of the vibratory structure, the process can be simplified and the accuracy adjustment of the natural frequency can be improved. Further, the functions of products can be fulfilled without the vibratory structure contacting the electrodes by adjusting the electrostatic force of the driving electrode and the force of the spring.

In the conventional technology, the displacement of the vibratory structure due to the Coriolis force is detected from the change of capacitance according to the change of the gap when the vibratory structure accesses to or is spaced from the sensing electrodes disposed vertically thereunder, and accordingly, a nonlinear output inversely proportional to the square of the gap is detected. However, in the present invention, while the vibratory structure moves in a direction parallel to the sensing electrode disposed vertically thereunder, the displacement due to the Coriolis force can be measured from the change of the capacitance with respect to the above displacement. Thus, the linearity of the output is enhanced.

It is noted that the present invention is not limited to the preferred embodiment described above, and it is apparent that variations and modifications by those skilled in the art can be effected within the spirit and scope of the present invention defined in the appended claims.

What is claimed is:

1. A microgyroscope comprising:

a substrate:

first sensing means including a plurality of stripe-shaped anodes and cathodes alternatively arrayed in parallel on said substrate and having a stripe length direction, said first sensing means being for sensing displacement of a vibratory structure;

driving means arranged to be perpendicular to said stripe length direction of said first sensing means on said substrate and including a second plurality of stripe-shaped anodes and cathodes alternatively arrayed in parallel to each other, said driving means for applying pressure to said vibratory structure;

said vibratory structure including a plurality of first grooves of a stripe shape vertically spaced from a plane of said first sensing means and said driving means at a predetermined height and formed in a direction congruous with said stripe length direction of said first sensing means, and a plurality of second grooves of a stripe shape formed in a direction congruous with said stripe length direction of said driving means;

a support portion formed on said substrate for maintaining said vibratory structure spaced from said substrate at said predetermined height; and elastic members for elastically connecting said vibratory structure and said support portion.

2. A microgyroscope according to claim 1, further comprising second sensing means arranged at both sides of said driving means in the same shape as those of the second plurality of stripe electrodes of said driving means, said second sensing means for detecting an initial vibration state of said vibratory structure to vibrate at a natural frequency.

3. A microgyroscope according to claim 1, wherein said first sensing means is disposed at two parallel positions on said substrate and said driving means is arranged between said two positions of said first sensing means.

4. A microgyroscope according to claim 2, wherein said first sensing means is disposed at two parallel positions on said substrate and said driving means is arranged between said two positions of said first sensing means.

5. A microgyroscope according to claim 1, further comprising second sensing means having a plurality of stripe-shaped anodes and cathodes wherein the stripe shape of said first sensing means is narrower and longer than that of said second sensing means and the stripe shape of said first grooves of said vibratory structure is narrower and longer than that of said second grooves.

6. A microgyroscope according to claim 2, wherein the stripe shape of said first sensing means is narrower and longer than that of said second sensing means and the stripe shape of said first grooves of said vibratory structure is narrower and longer than that of said second grooves.

7. A microgyroscope according to claim 1, wherein a portion of said vibratory structure where said first grooves correspond to said first sensing means positioned vertically thereunder and a portion of said vibratory structure where said second grooves correspond to said driving means and said second sensing means positioned vertically thereunder.

8. A microgyroscope according to claim 2, wherein a portion of said vibratory structure where said first grooves correspond to said first sensing means positioned vertically thereunder and a portion of said vibratory structure where said second grooves correspond to said driving means and said second sensing means positioned vertically thereunder.

* * * * *